A. J. CARLTON.
TRANSMISSION MECHANISM.
APPLICATION FILED JULY 24, 1913.
1,097,532.
Patented May 19, 1914.
2 SHEETS—SHEET 2.
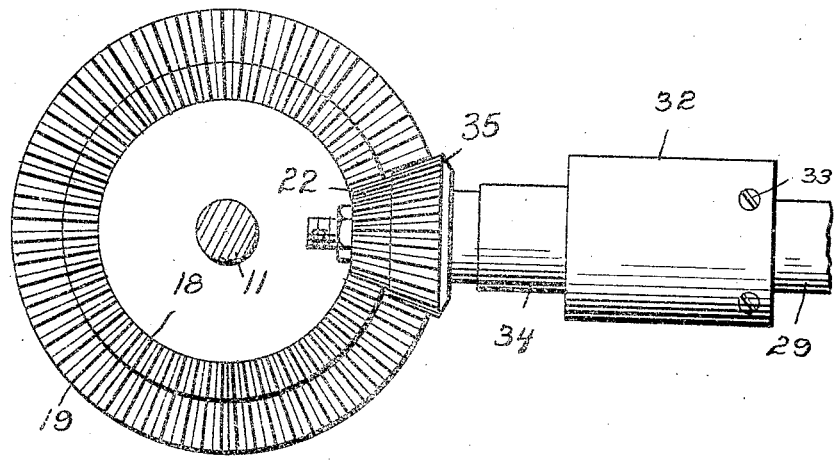
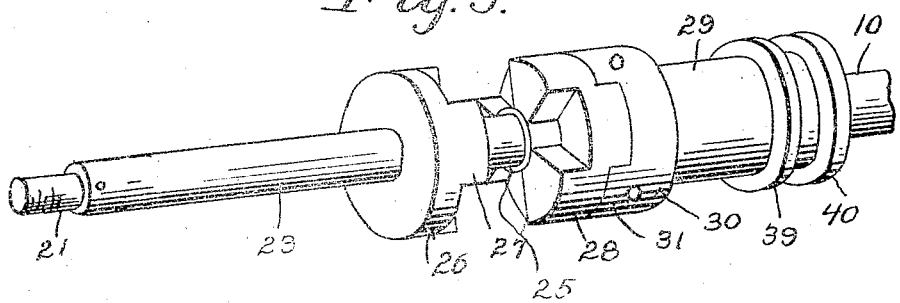
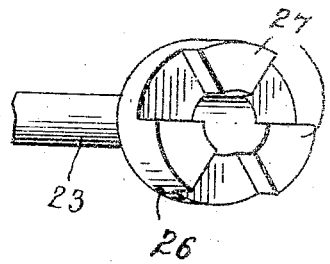 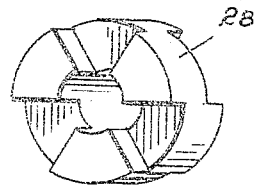 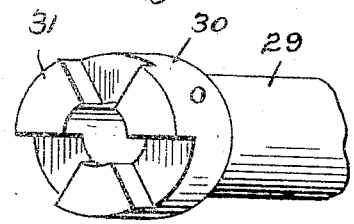
Witnesses
R. M. Jones.
E. H. Jester.
Inventor
A. J. Carlton.
By
Attorney.

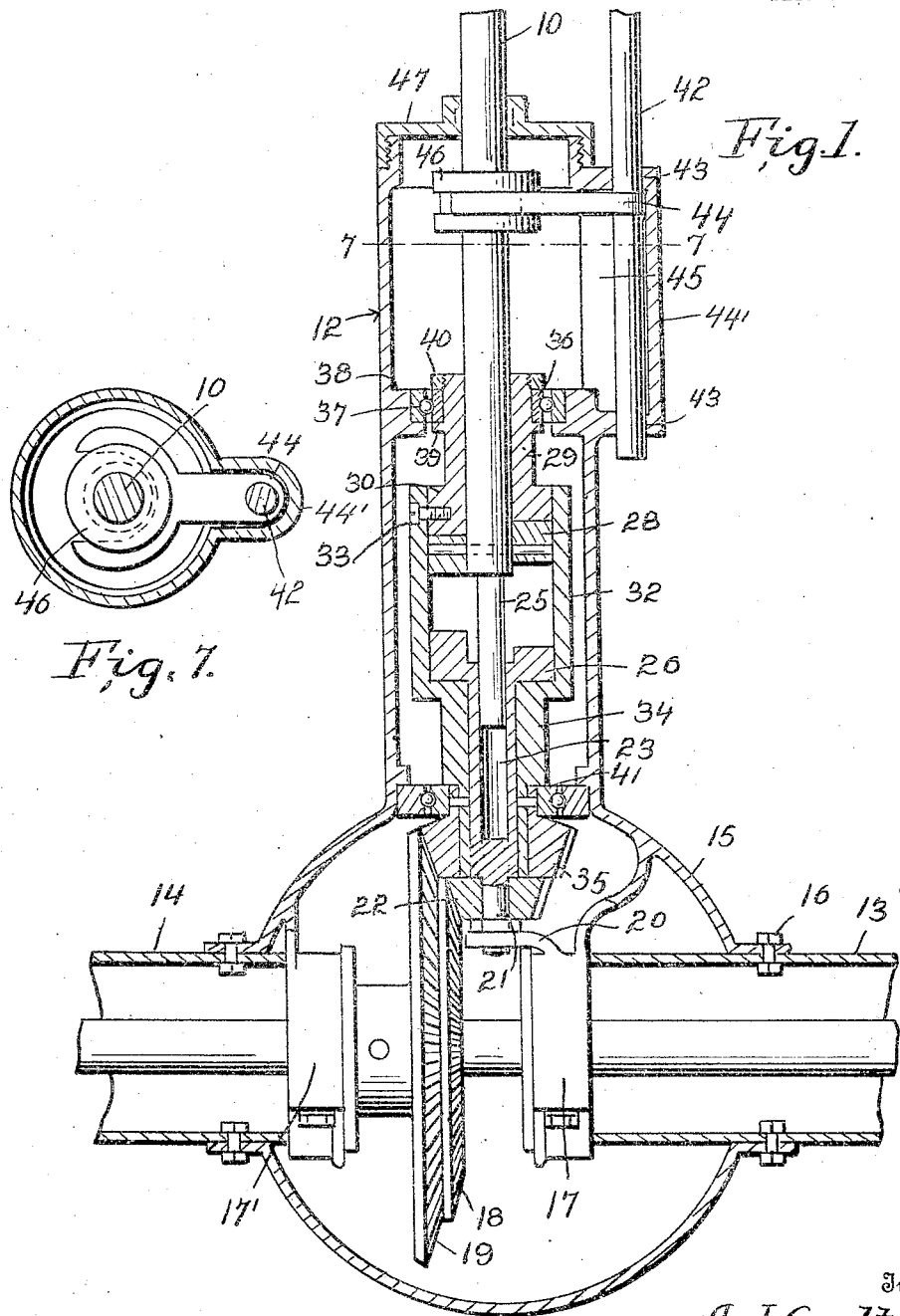

UNITED STATES PATENT OFFICE.

ALLEN J. CAMERON, OF FELLOWS, CALIFORNIA.

TRANSMISSION MECHANISM.

1,097,582.  Specification of Letters Patent.  Patented May 19, 1914.

Application filed July 24, 1913. Serial No. 781,041.

*To all whom it may concern:*

Be it known that I, ALLEN J. CAMERON, a citizen of the United States, residing at Fellows, in the county of Kern and State of California, have invented certain new and useful Improvements in Transmission Mechanisms; and I do hereby declare the following to be a full, clear, and exact description of the invention, such as will enable others skilled in the art to which it appertains to make and use the same.

This invention comprehends improvements in power transmission mechanism and relates more particularly to a two-speed transmission mechanism which is particularly adapted for use in connection with motor vehicles.

One of the objects of the invention resides in the provision of a two-speed power transmission mechanism which shall be of extremely simple construction, cheap to manufacture, and very strong and durable.

Another and more specific object of the invention is to provide a transmission mechanism of this type including a driven shaft carrying a pair of bevel gears of different sizes, a driving shaft movable longitudinally and having a clutch member rigidly secured thereto which is adapted to lock at different times with clutch members, which latter actuate gears that mesh with the first mentioned gears.

With these and other objects in view, as will become more apparent as the description proceeds, the invention consists in certain novel features of construction, combination, and arrangement of parts, as will become more apparent as the description proceeds.

For a complete understanding of my invention, reference is to be had to the following description and accompanying drawings, in which, Figure 1 is a longitudinal sectional view of my improved transmission mechanism, Fig. 2 is a side elevation with the driving shaft in section, showing the gears carried by the driven shaft and the gears which drive said first mentioned gears. Fig. 3 is a perspective of the clutch mechanism, Fig. 4 is a detail perspective view of one of the non-sliding clutch members, Fig. 5 is a perspective view of the sliding clutch member, Fig. 6 is a perspective view of the other non-slidable clutch member, and, Fig. 7 is a section taken on the plane of line 7—7 of Fig. 1.

Referring in detail to the drawing by numerals, 10 designates the driving shaft, 11 the driven shaft which extends at right angles to the driving shaft and which is adapted to be driven therefrom through the medium of my transmission mechanism. A casing designated as an entirety by the numeral 12, surrounds the driving shaft and coöperates with the casings 13 and 14, which inclose the driven shaft to completely envelop the transmission mechanism and may also inclose a differential, not shown. The casings 13 and 14 extend into the enlarged portion 15 of the casing 12 and are secured therein by suitable fasteners 16. The portion 15 supports bearings 17 and 17' for the shaft 11, which shaft has rigidly secured thereto the small bevel gear 18 and the large bevel gear 19. An arm 20 is formed upon the periphery of the bearing 17 and is apertured to form a guide or bearing for the lower end of the stub shaft or spindle 21, which extends through the aperture at right angles to the shaft 11. A bevel gear 22 is rigidly secured to the stub shaft 21 in any suitable manner and meshes with the small bevel gear 18. The stub shaft 21 is extended into a sleeve 23 and formed integrally therewith. One end of the sleeve bears against one side of the gear 22 shown in Fig. 1. The driving shaft 10 is of a reduced diameter adjacent one end, as indicated by the numeral 25 and this reduced portion is adapted to telescope within the sleeve 23. A clutch member 26, clearly shown in Fig. 4, is formed upon one end of the sleeve 23 and surrounds the reduced portion 25 of the shaft 10. This clutch member is circular and is formed with the teeth 27 which are adapted to engage the teeth formed upon one side of the clutch member 28, which is rigidly secured to the driving shaft adjacent the reduced portion 25 or which may be formed integrally therewith.

A sleeve 29 surrounds the unreduced portion of the shaft 10 and is formed with a clutch member 30 having teeth 31 which are adapted to interlock with the teeth of the sliding clutch member 28. These various clutch members are all circular and of the same diameter. A cylindrical clutch casing 32 is secured by means of machine screws 33, to the periphery of the clutch member 30 and envelops the other two clutch members. A sleeve 34 is formed integrally with the end of the clutch casing opposed to the driven shaft and surrounds the sleeve 23. The sleeve 34 has secured to its rear end a bevel pinion or gear 35 which bears against the gear 22 and which meshes with the large bevel gear 19.

A bearing consisting of the rings 36 spaced by the anti-friction balls 37, is supported within the cylindrical portion of the casing 12 by means of an annular flange 38, and the inner of said rings is secured to the sleeve 29 between an integrally formed flange 39 and a removable ring 40. A bearing, generally designated 41 similar to the one just described, is mounted within the casing 12 adjacent the enlarged portion 15 thereof and serves to properly support the gear 35. It will be noted that this gear is reduced adjacent its forward end and that the sleeve 34 is of a reduced diameter within the gear 35, forming a shoulder for engagement with the bearing 41.

To provide for moving the driving shaft 10 longitudinally I provide a shift rod 42 which extends through openings 43 formed in the enlarged portion 44' of the casing 12. This rod carries a forked arm 44 which extends into the casing 12 and which engages a grooved collar 46 rigidly secured to the driving shaft. A cap 47 closes the forward end of the casing 12 and forms a bearing for the shaft 10.

When the parts are arranged as shown in Fig. 1, the shaft 10 will drive the sleeve 29 through the medium of the clutch members 28 and 30 and the sleeve will revolve the clutch casing 32 and sleeve 34. The rotation of the sleeve 34 revolves the gear 35 which latter in turn drives the large bevel gear 19 secured to the driven shaft 11. When a higher speed is desired, the shift rod 42 is moved toward the driving shaft 11 so as to engage the clutch member 28 with the clutch member 26, at which time the small bevel gear 18 is directly driven by means of the bevel gear 22 connected to the stub shaft 21, said stub shaft being as before mentioned, secured to the sleeve 23.

From the foregoing description taken in connection with the accompanying drawings, it will be apparent that I have provided a very simple and practical two-speed transmission mechanism which is embodied in the smallest possible number of parts and which is very strong and durable.

It is to be understood that while I have shown and described the preferred embodiment of my invention, I do not wish to be limited to this exact construction, combination, and arrangement of parts, but may make such changes as will fall within the spirit and scope of the invention as claimed.

Having thus described my invention, I claim:—

In a transmission gearing, a longitudinally movable driving shaft, a driven shaft extending at right angles thereto, a pair of different sized bevel gears concentric with the driven shaft and rigidly secured thereto, a sleeve interposed between the two shafts and surrounding one end of the driving shaft, a bevel gear rigidly secured to one end of the sleeve and meshing with the smaller bevel gear, a clutch member formed upon the other end of the sleeve, a second sleeve surrounding the driving shaft, a clutch member formed upon said second sleeve, a casing rigidly secured to said second mentioned clutch member and revoluble therewith, a sleeve formed upon the casing and surrounding the first mentioned sleeve, a second bevel gear secured to the second mentioned casing and meshing with the large bevel gear, and a clutch member rigidly secured to the driving shaft, a movement of the driving shaft in one direction causing the last mentioned clutch member to interlock with the first mentioned clutch member and drive the small bevel gear and a movement of the driving shaft in the other direction causing the last mentioned clutch member to engage the second mentioned clutch member and drive the large bevel gear.

In testimony whereof I affix my signature in presence of two witnesses.

ALEN J. CARLTON.

Witnesses:
CHARLES DEL BONDIO,
C. E. NEFF.